United States Patent Office 2,889,311
Patented June 2, 1959

2,889,311

STYRENE POLYMERS

Earl C. Chapin and Raymond I. Longley, Jr., Springfield, Mass., assignors to Monsanto Chemical Company, St. Louis, Mo., a corporation of Delaware No Drawing. Application November 14, 1955
Serial No. 546,773

6 Claims. (Cl. 260—73)

This invention relates to copolymers of vinyl aromatic compounds with methacrolein. More particularly the invention relates to low molecular weight copolymers which are soluble in organic solvents and to a process for preparing them.

The known copolymers of vinyl aromatic compounds and methacrolein are of high molecular weight, hard, and insoluble in organic solvents. They are useful as molding powders wherein solvency is not a prerequisite. But they can not be used in coating compositions and adhesives where solvency is required.

One object of this invention is to provide low molecular weight copolymers of methacrolein and vinylidene aromatic compounds which are soluble in organic solvents.

A further object is to provide a process for the preparation of low molecular weight copolymers of methacrolein and vinylidene aromatic compounds.

These and other objects are attained by copolymerizing methacrolein with a vinylidene aromatic compound at temperatures ranging from 140° C. to 250° C. under autogenous pressure and then distilling off low boiling material.

In the following illustrative examples, parts are parts by weight.

Example I

Mix 60 parts of commercial methacrolein with 40 parts of commercial styrene and 1 part of di-tertiary butyl peroxide and heat the mixture in an inert atmosphere in a closed pressure-resistant vessel for 30 minutes at 160° C. Then heat the product to 180° C. under a vacuum of about 1 mm. of mercury to distill off low boilers. The conversion is about 42% to a brittle copolymer containing about 48% by weight of methacrolein. The copolymer is soluble in acetone, methyl ethyl ketone and tetrahydrofurane. The molecular weight of the copolymer is less than 10,000.

Example II

Mix 78 parts of styrene with 52 parts of methacrolein, 54 parts of xylene and 1 part of di-tertiary butyl peroxide and heat the mixture in an inert atmosphere in a closed pressure resistant vessel for 90 minutes at 150° C. Then heat the product to about 180° C. under a vacuum of about 1 mm. of mercury to distill off low boiling material. About 63 parts of a brittle copolymer of styrene and methacrolein containing about 28% by weight of methacrolein is obtained. The copolymer is soluble in acetone, methyl ethyl ketone and tetrahydrofurane. Its molecular weight is considerably lower than that of the copolymer of Example I.

Example III

Mix 30 parts of distilled styrene with 30 parts of distilled commercial methacrolein and heat the mixture in an inert atmosphere in a closed pressure-resistant vessel for 150 minutes at 180° C. Then heat the product to about 180° C. under a vacuum of about 1 mm. of mercury to distill off low boilers. Over 27 parts of a brittle copolymer containing about 40% by weight of methacrolein chemically combined are obtained. The copolymer is soluble in acetone, methyl ethyl ketone and tetrahydrofurane and has a molecular weight intermediate between the molecular weights of the copolymers of Example I and Example II.

The copolymers of this invention are copolymers of methacrolein and a vinylidene aromatic compound. Among the vinylidene aromatic compounds which may be used are styrene, alpha methylstyrene, o-, m-, and p-methylstyrenes, alpha methyl-para-methylstyrene, o-, m-, and p-chlorostyrenes, the various ring-substituted dichlorostyrenes and mixtures thereof. The ratio of methacrolein to vinylidene aromatic compound in the polymerizable mixture may vary from 20–80 to 80–20 on a weight basis. The copolymers resulting from the polymerization process will contain from 20–60% by weight of chemically combined methacrolein.

The polymerization reaction should be carried out at temperatures ranging from 140° C. to 250° C. in closed reaction vessels at autogenous pressure i.e. the pressure developed in the vessel by the partial pressure of the monomers at the temperature of the reaction. The reaction may be carried out in the presence or absence of free radical producing catalysts such as peroxy compounds including benzoyl peroxide, di-tertiary butyl peroxide, oxygen, etc., radiant energy, gamma rays, etc. If a peroxy catalyst is to be used, the amount will vary from 0.1 to 5 parts per 100 parts of monomer mixture.

If desired the reaction may be carried out in the presence of an inert organic solvent or an organic liquid which acts both as a solvent for the reaction and as a chain transfer agent. Aromatic hydrocarbons and chlorinated aliphatic hydrocarbons are the preferred liquids for this embodiment of the invention. Hydrocarbons such as benzene fall within the class of materials which act only as solvents. Xylene is one of the materials which acts as both solvent and chain transfer agent. In either event, the molecular weight of the resulting copolymers is lower with the use of the organic medium than it is when the monomer mixture is not diluted. The amount of organic medium to be used may vary from 20–80 parts per 100 parts of monomer mixture.

At the end of the polymerization reaction which takes from 15 to 300 minutes, unreacted monomers and low boiling reaction products should be removed from the product. The removal may be accomplished by vacuum distillation at temperatures above 175° C. under a vacuum of less than 5 mm. of mercury or by steam distillation.

The products of this reaction are hard brittle resins which are soluble in organic solvents such as the ketones e.g., acetone, methyl ethyl ketone, etc., hot alcohols, hot xylene, toluene etc., tetrahydrofurane, etc. They are substantially colorless and may be added to various surface coating resin formulations to improve the properties thereof.

The copolymers have a molecular weight ranging from 700 to 10,000 depending on the conditions of temperature, catalyst and organic reaction medium. The solubility of the copolymers increases with lower molecular weight.

The foregoing and particularly the examples are given in illustration of this invention and it is obvious that many variations may be made within the spirit and scope of this invention.

What is claimed is:

1. An organic solvent-soluble copolymer of methacrolein and a vinylidene aromatic compound, said copolymer having a molecular weight in the range of 700–10,000 and a chemically-combined methacrolein content of 20–60% by weight, said copolymer having been prepared by subjecting a reaction mixture to temperatures of 140–250° C. under autogenous pressure and then removing low-boiling by-products, said vinylidene aromatic compound being a member of the group consisting of styrene, alpha-methylstyrene, o-, m-, and p-monomethylstyrenes, alpha-methyl-p-methylstyrene, o-, m-, and p-chlorostyrenes, and dichlorostyrenes, said reaction mixture being a member of the group consisting of (a) a mixtre consisting of 20–80 parts by weight of methacrolein and, correspondingly, 80–20 parts by weight of the vinylidene aromatic compound, (b) a mixture consisting of 100 parts by weight of (a) and 20–80 parts by weight of an aromatic hydrocarbon solvent, (c) a mixture consisting of (a) and a catalytic amount of free radical-producing catalyst, and (d) a mixture consisting of (b) and a catalytic amount of a free radical-producing catalyst.

2. A copolymer as in claim 1 wherein the reaction mixture consists of 20–80 parts by weight of methacrolein and, correspondingly, 80–20 parts by weight of the vinylidene aromatic compound.

3. A copolymer as in claim 1 wherein the reaction mixture consists of 20–80 parts by weight of an aromatic hydrocarbon solvent and 100 parts by weight of a monomer mixture consisting of 20–80 parts by weight of methacrolein and, correspondingly, 80–20 parts by weight of the vinylidene aromatic compound.

4. A copolymer as in claim 1 wherein the reaction mixture consists of a catalytic amount of a free radical-producing catalyst and a monomer mixture consisting of 20–80 parts by weight of methacrolein and, correspondingly, 80–20 parts by weight of the vinylidene aromatic compound.

5. A copolymer as in claim 1 wherein the reaction mixture consists of a catalytic amount of a free radical-producing catalyst, 20–80 parts by weight of an aromatic hydrocarbon solvent, and 100 parts by weight of a monomer mixture consisting of 20–80 parts by weight of methacrolein and, correspondingly, 80–20 parts by weight of the vinylidene aromatic compound.

6. A copolymer as in claim 1 wherein the vinylidene aromatic compound is styrene.

References Cited in the file of this patent

UNITED STATES PATENTS

| | | |
|---|---|---|
| 2,256,152 | Nutting et al. | Sept. 16, 1941 |
| 2,514,168 | Smith et al. | July 4, 1950 |
| 2,651,624 | Swart | Sept. 8, 1953 |
| 2,657,192 | Miller et al. | Oct. 7, 1953 |

OTHER REFERENCES

Smith et al.: Jour. Amer. Chem. Soc., vol. 73, November 1951, pages 5273–80.